US012751891B2

(12) United States Patent
Del Valle Fernandez

(10) Patent No.: US 12,751,891 B2
(45) Date of Patent: Oct. 6, 2026

(54) BODY MASSAGE DEVICE

(71) Applicant: TERMOSALUD, S.L., Gijon-Asturias (ES)

(72) Inventor: Ivan Del Valle Fernandez, Gijon-Asturias (ES)

(73) Assignee: TERMOSALUD, S.L., Gijon-Asturias (ES)

( * ) Notice: Subject to any disclaimer, the term of this patent is extended or adjusted under 35 U.S.C. 154(b) by 758 days.

(21) Appl. No.: 17/997,059

(22) PCT Filed: Dec. 10, 2020

(86) PCT No.: PCT/EP2020/085519
§ 371 (c)(1),
(2) Date: Oct. 25, 2022

(87) PCT Pub. No.: WO2021/219238
PCT Pub. Date: Nov. 4, 2021

(65) Prior Publication Data

US 2023/0165748 A1 Jun. 1, 2023

(30) Foreign Application Priority Data

Apr. 27, 2020 (ES) ................................ ES202030355

(51) Int. Cl.
*A61H 15/00* (2006.01)
*A61H 15/02* (2006.01)

(52) U.S. Cl.
CPC ......... *A61H 15/0085* (2013.01); *A61H 15/02* (2013.01); *A61H 2201/018* (2013.01);
(Continued)

(58) Field of Classification Search
CPC ................ A61H 15/0085; A61H 15/02; A61H 2201/018; A61H 2201/0207;
(Continued)

(56) References Cited

U.S. PATENT DOCUMENTS 4,112,923 A * 9/1978 Tomecek ............. A61B 5/0532 600/11
5,618,315 A * 4/1997 Elliott ................ A61H 23/0218 606/237
2003/0212354 A1* 11/2003 Kahn ..................... A61H 7/003 601/99
2013/0274839 A1* 10/2013 Johnson ................... A61N 5/06 607/90
2015/0119771 A1* 4/2015 Roberts .............. A61H 23/0218 601/135
(Continued)

FOREIGN PATENT DOCUMENTS

CN 205586230 U * 9/2016
KR 20200033720 A 3/2020

OTHER PUBLICATIONS

International Search Report and Written Opinion for Corresponding International Application No. PCT/EP2020/085519 (10 Pages) (Apr. 7, 2021).

*Primary Examiner* — Timothy A Stanis
*Assistant Examiner* — Matthew R Moon
(74) *Attorney, Agent, or Firm* — LUCAS & MERCANTI, LLP

(57) ABSTRACT

A body massage device which includes a handpiece with movable heads (2) for applying force on the body of a patient and a massage arm connected to the movable heads (2). A motor (4) mechanically coupled to the movable heads (2) for conveying motion thereto. Measurement device having a temperature sensor (8), a vertical force sensor (15), and a torque sensor (14) for measuring the resistance to rotation of the movable heads (2). An electromagnetic radiation generator (12) for generating it at a determined frequency and intensity. A power supply (11) that provides power to the electromagnetic radiation generator (12) and to the handpiece. The movable heads (2) apply electromagnetic radiation on the patient. A processing unit (13) receives measurement information and estimates the effective depth of the treatment, determining in real time if the applied force is appropriate.

10 Claims, 3 Drawing Sheets

(52) U.S. Cl.
CPC ................ *A61H 2201/0207* (2013.01); *A61H 2201/5061* (2013.01); *A61H 2201/5082* (2013.01)

(58) Field of Classification Search
CPC .... A61H 2201/5061; A61H 2201/5082; A61H 2201/0153; A61H 2201/0173; A61H 2201/1215; A61H 2201/1676; A61H 2230/505; A61H 7/007; A61H 2201/10; A61H 39/00; A61H 39/04; A61H 2039/005; A61N 1/40
See application file for complete search history.

(56) References Cited

U.S. PATENT DOCUMENTS

| | | | | |
|---|---|---|---|---|
| 2015/0305969 | A1* | 10/2015 | Giraud | A61H 7/005 601/84 |
| 2016/0000642 | A1* | 1/2016 | Zipper | A61H 19/34 600/38 |
| 2016/0128605 | A1* | 5/2016 | Moreno | A61H 7/008 601/6 |
| 2017/0319429 | A1 | 11/2017 | Marty et al. | |
| 2018/0361137 | A1* | 12/2018 | Kern | A61N 1/322 |
| 2019/0029919 | A1* | 1/2019 | Suh | A61H 31/006 |
| 2019/0374429 | A1* | 12/2019 | Giacometti | A61H 31/005 |
| 2020/0188211 | A1* | 6/2020 | Ellermann | B60Q 3/233 |
| 2020/0390642 | A1* | 12/2020 | Kim | A61N 1/0456 |
| 2021/0154093 | A1* | 5/2021 | Boone, III | A61H 7/005 |

* cited by examiner

BODY MASSAGE DEVICE

CROSS-REFERENCE TO RELATED APPLICATIONS

This application is a 371 of PCT/EP2020/085519, filed Dec. 10, 2020, which claims the benefit of Spanish Patent Application No. P202030355, filed Apr. 27, 2020, each of which are incorporated herein by reference.

FIELD OF THE INVENTION

The present invention falls within the devices used for massaging patients, especially those that have an additional energy source for improving the effect of said massages, and incorporating the monitoring of the effective depth of the treatment.

BACKGROUND OF THE INVENTION

There are numerous massage devices, which provide the user with the ability to apply a massage homogeneously and without causing fatigue in the therapist.

Some massage devices that use brushes, gears, and drive chains generate excessive friction which negatively affects the effectiveness of the massage.

Other devices comprise a handpiece, that is, a support to be used with the therapist's hand that has a series of spherical elements (also called heads) which press the patient's body when the massage is performed. This handpiece ends in a massage arm which comprises the spherical elements, which can rotate while moving along the patient's body, improving the massage effect. Sometimes, there are sensors for the applied vertical force.

Recently, massage devices have appeared that use a heat supply for accompanying massage movements. This heat source is usually in the form of infrared radiation or Joule currents. Due to this heat, the effect of the massage is improved, since a better preparation of the connective tissue is achieved.

BRIEF DESCRIPTION OF THE INVENTION

Despite the aforementioned advances, there is room for improvement in existing devices. Existing devices omit important parameters for treatment, even those that combine rotary massage and electromagnetic radiation.

The movable heads apply a rotary massage with much less effort from the therapist, even keeping the handpiece of the massage device static. The present invention applies rotary massage and makes use of the effective depth parameter, which is understood as the distance that it is convenient to reach with the massage.

Determining the effective depth is not trivial. Although there are solutions capable of detecting the vertical force applied in a treatment, this information alone does not enable the effective depth to be identified. The effective depth varies according to the features of the patient (for example, large or thin) and also the specific area of the body. The layer of fat under the skin is the main factor in effective depth, but not the only one.

It has been found that the effective depth is further conditioned by factors such as the elasticity of the skin, hydration or friction of the head on the area to be applied.

In short, based on his subjective experience the therapist must judge whether the massage is performed at appropriate depth and/or pressure.

To address the identified limitations, the present invention is proposed, which discloses a device for body massage which monitors the effectiveness of the treatment by means of the technical features of the main claim.

The massage device has a handpiece comprising a plurality of movable heads for applying force on a patient's body and a massage arm connected to the movable heads. It includes a motor mechanically coupled to the movable heads for conveying motion thereto. It includes measurement means comprising a vertical force sensor for measuring the force applied perpendicularly on the patient's body, and a torque sensor for measuring the resistance to rotation of the movable heads on the patient's body. Optionally, it can incorporate a thermometer for taking the temperature of the area of the patient's body where the heads are applied. It includes an electromagnetic radiation generator for generating electromagnetic radiation with a fixed frequency and intensity, and applying it to the patient's body through the movable heads. It includes a processing unit which, with the information from the measurement means, estimates the effective depth of the treatment on the patient's body. The processing unit determines in real time if, for the estimated effective depth, the applied force is appropriate.

Unless defined otherwise, all terms (both scientific and technical) used in this document are to be interpreted as a person skilled in the art would. It will be understood, therefore, that the terms of common use must be interpreted in the way that a connoisseur of the subject matter would, and not in an idealised or strictly formal way.

Throughout the text, the word "comprises" (and the derivatives thereof, such as "comprising") should not be understood in an exclusive way, but should be understood in the sense that they admit the possibility that what is defined may include additional elements or steps.

DESCRIPTION OF THE FIGURES

Below is a brief description of each of the figures used to complete the description of the invention that follows. Said figures are related to embodiments of the invention, which are presented as non-limiting examples thereof.

NUMERICAL REFERENCES USED IN FIGURES

Figure 1:
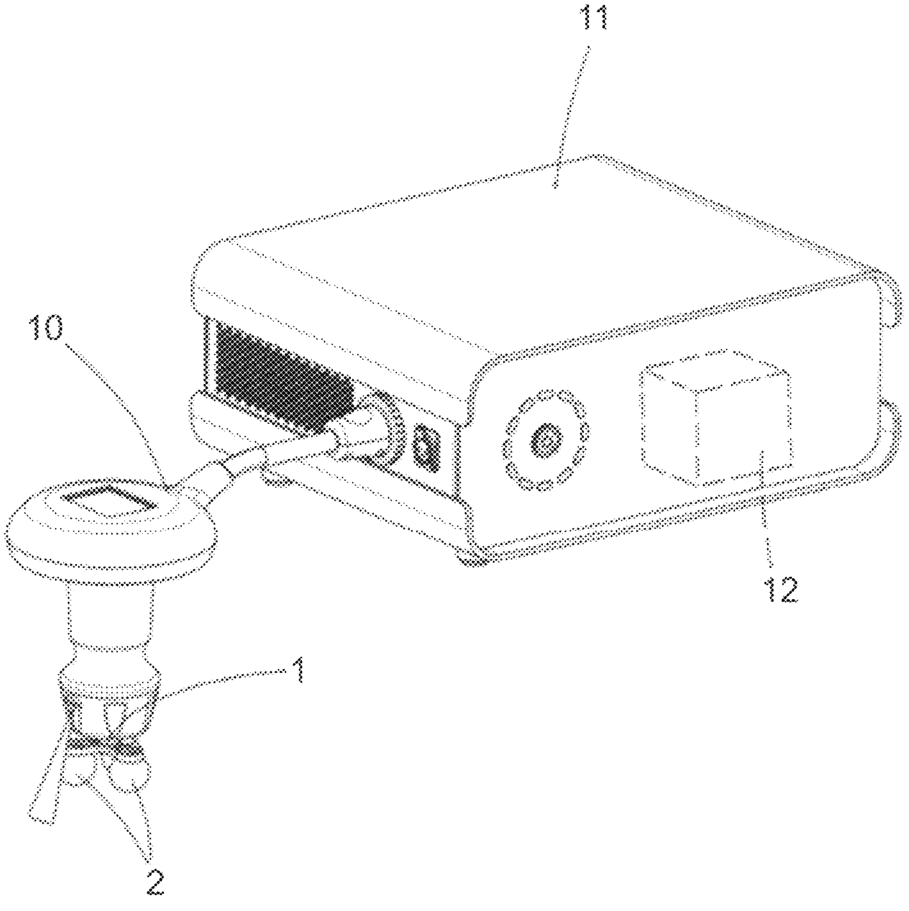
FIG. 1 shows a general view of a massage device according to the invention.

1 Massage arm
2 Movable heads
3 Conductor cable
4 Gearmotor
5 Electrical insulator
6 Static element of drive assembly (ring)
7*a* Bearing of the dynamic element of the drive assembly
7*b* Coupling piece of the dynamic element of the drive assembly
8 Temperature sensor
9 Fastening magnet
10 Handpiece
11 Power source
12 Electromagnetic radiation generator unit

13 Processing unit
14 Torque sensor
15 Vertical force sensor
16 Interface
17 Indicator
18 Control panel

DETAILED DESCRIPTION OF THE INVENTION

Different aspects of an exemplary embodiment of the present invention are now described, for merely illustrative and non-limiting purposes.

FIG. 1 shows a general view of a massage device, including a power source 11, comprising an electromagnetic wave generator unit 12, a handpiece 10, which is connected to the power source 11.

This handpiece 10 serves as a support so that the therapist can perform a massage on a patient. The handle 10 in turn comprises various elements that contribute to the purpose of the invention.

In this general figure, a massage arm 1 with a series of massage applicator heads 2 is observed. These heads 2 are intended for pressing the patient's body, for which they comprise a spherical surface, such that contact is favoured.

In addition to pressing, the heads 2 receive energy in electromagnetic radiation waves that is directly radiated onto the patient's body.

The fact that said electromagnetic radiation is directly emitted through the movable heads 2, instead of through a static support, has a very advantageous effect on the treatment, achieving a therapeutic synergy that enhances the results of each effect separately.

On the one hand, the mechanical activation of different cells and tissues is enhanced, and on the other, peripheral and lymphatic flow is improved due to the application of heat exactly on the area where mechanical activation is taking place.

At the same time, the electrical effect of the passage of electromagnetic waves through the skin causes a biochemical stimulation which favours the elimination of fats and inhibits the accumulation thereof. In addition, it stimulates the cells that produce elastic fibres.

In particular embodiments, the source of electromagnetic waves is modulated with a low-frequency modulating signal (10 Hz to 40 KHz). This modulation can be done by means of the pulse width control.

Physiologically, the modulation of the electromagnetic wave carrier signal generates an increase in the permeability of plasma cell membranes. On the one hand, the correct dissemination of substances between the extracellular spaces and the cells themselves is favoured; and on the other hand, the exchange capacity of the lymphatic capillaries is improved.

These two effects facilitate the processes of uptake of nutrients and oxygen and the processes of excretion of waste substances to the extracellular environment. An increase in cell permeability in the lymphatic capillaries facilitates a more effective removal of excreted metabolites to the interstitial compartment, reducing inflammation and the consequences thereof.

Figure 2:
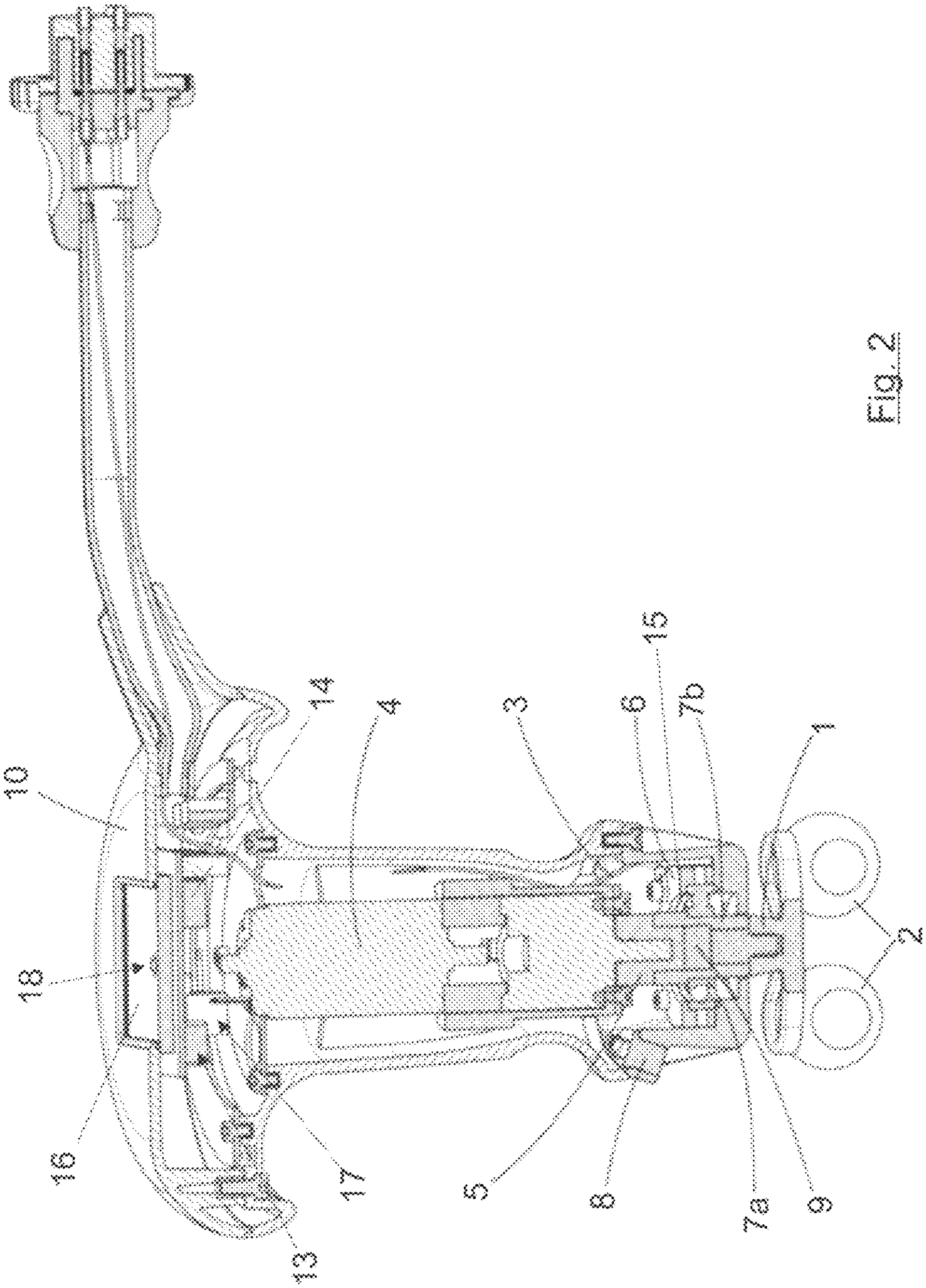
FIG. 2 comprises a cross-sectional view of the handpiece shown in the previous figure, for a better understanding of the operation thereof.

FIG. 2 comprises a cross-sectional view of one particular embodiment of the handpiece 10 shown in the previous figure, for a better understanding of the mechanical and electrical operation thereof.

Firstly, the mechanical connection that enables the rotation of the movable heads 2 is analysed. The handpiece 10 comprises a motor, electric gearmotor 4, which is electrically powered to the machine. This electric gearmotor 4 has an output shaft covered by an electrical insulator 5, which in turn fits into a dynamic drive element. The purpose of this dynamic drive element is to transmit the motion of the electric gearmotor 4 to the massage arm 1, and is formed by a bearing **7*a* and the coupling piece for coupling to the massage arm 7*b*. This bearing ensures the stable rotation of the massage arm 1, by supporting it on a static element 6, which in this case is a ring fastened to the lower portion of the handpiece 10**.

Second, the electrical connection between the elements will be analysed. The power source 11 provides energy to an electromagnetic wave generator 12, capable of suitably modulating the carrier signal, and said wave is transmitted along a conductor cable 3. Advantageously, the electromagnetic wave generator can be housed in a machine separate from the handpiece 10. The conductor cable 3 runs through the connection between the power source 11, the electromagnetic wave generator 12 and the handpiece 10 until it makes electrical contact with a static element, the ring 6. Therefore, the conductor cable 3 is free from rotational movements, since it has run through the static portion of the actuator element until it makes contact with the ring 6. Thereby, the electrical connection between the electromagnetic wave generator 12 of the power source 11 and the ring 6 of the handpiece 10 is achieved.

Both the ring 6 and the bearing **7*a* and the coupling piece of the massage actuator elements 7*b* are made of conductive material. In addition, the movable heads 2 are also made of conductive material, so that the electromagnetic waves are transmitted to the massage applicators 2 themselves. The massage arm 1 containing the movable heads 2 is fixed to the coupling piece 7*b* by means of a magnet 9**.

The torque sensor 14 measures the resistance to rotation, in one embodiment it is performed with a current sensor incorporated in the electronic control board, which also operates as a processing unit 13. By means of an algorithm described below it is computed combining it with the vertical force sensor 15, to continuously monitor the effective depth in a user interface for the interaction of the therapist.

The processing unit 13, in addition to applying the precise control logic, enables the interaction with the therapist through the interface 16, which contains a control panel 18 for receiving the work command and monitor the parameters of the session. It includes an indicator 17, which by means of a beep informs the therapist of errors or warnings that require his attention during treatment.

Finally, the handpiece 10 further comprises a temperature sensor 8, which continuously measures the evolution of the temperature of the treated area of the patient, being reflected on the interface 16 to be consulted by the therapist. This temperature must be comprised within an established range, generally between 42° C. and 45° C. to facilitate the correct mobilisation of fat. Temperature monitoring enables the therapist to control that the treatment is being appropriately and safely performed. A temperature higher than 45° C. can cause burns. A temperature lower than 42° C. has no effect on body fat.

Figure 3:
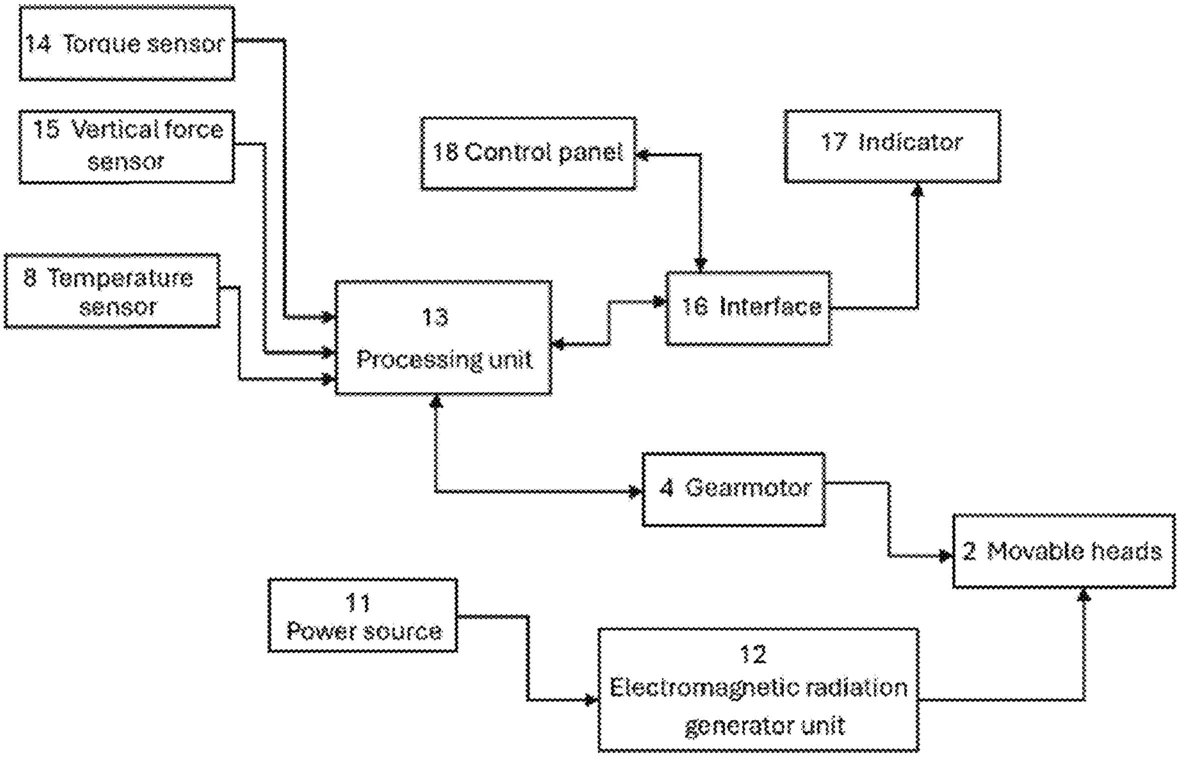
FIG. 3 is a block diagram of the invention.

FIG. 3 schematically illustrates a block diagram of a massage device to show the functional relationships between different elements. A motor or gearmotor 4 is shown that applies rotational motion on the movable heads 2. A set of sensors that includes the temperature sensor 8, the vertical force sensor 15 (vertical force exerted by the therapist) and the torque sensor 14. These sensors perform measurements in order to know the vertical force and torque that the movable heads 2 convey on the patient. These measurements are provided to the processing unit 13.

Moreover, the electromagnetic radiation generator 12 generates electromagnetic radiation with a frequency and intensity previously selected by the therapist according to the type of massage, for example, with the interface 16. The characteristics of the generated radiation are provided to the processing unit 13. This radiation reaches the patient through the movable heads 2. The processing unit 13 analyses the information and establishes whether the massage is being appropriately applied to the patient.

For this purpose, the processing unit 13 calculates the aforementioned parameter called effective depth which informs about the depth of the treatment. This parameter has a value that is mainly a function of the vertical force applied, the torque and the amount of fat. It also depends secondarily on other features of the patient, such as hydration and firmness of the skin.

The processing unit 13 is programmed to control whether the vertical force applied by the therapist is sufficient to reach the fatty layer of the patient. A shallower depth means that the target area where the fat is located is not effectively reached, so the fat liquefies with the electromagnetic radiation but is not properly mobilised. A greater depth means that it reaches the muscle area, which is not appropriate, it is painful and even dangerous.

Given the factors on which they depend, the effective depth varies greatly between patients, so the simple measure of vertical force applied is not enough to determine if the target area is reached.

For this reason, to estimate this effective depth, in one of the embodiments a developed algorithm is implemented that relates different variables taking the values empirically. To obtain the relationship between the two measured parameters, an experienced therapist applies the equipment to a patient and determines when he is in a suitable effective depth range and with what vertical force and resistance to rotation measurements, obtaining the following table (column: vertical force, rows: torque, result: effective depth in mm):

| Vertical | Horizontal force (%) | | | | | | | | | |
|---|---|---|---|---|---|---|---|---|---|---|
| force (%) | 10 | 20 | 30 | 40 | 50 | 60 | 70 | 80 | 90 | 100 |
| 10 | 1 | 1 | 1 | 2 | 3 | 4 | 5 | 6 | 7 | 10 |
| 20 | 1 | 2 | 3 | 3 | 5 | 7 | 8 | 10 | 15 | 20 |
| 30 | 2 | 2 | 3 | 5 | 7 | 10 | 11 | 15 | 20 | 25 |
| 40 | 3 | 3 | 4 | 7 | 10 | 14 | 15 | 19 | 24 | 30 |
| 50 | 4 | 5 | 6 | 10 | 13 | 17 | 19 | 25 | 29 | 36 |
| 60 | 6 | 7 | 8 | 13 | 16 | 20 | 23 | 28 | 32 | 41 |
| 70 | 8 | 9 | 11 | 16 | 20 | 24 | 27 | 31 | 36 | 47 |
| 80 | 12 | 13 | 15 | 20 | 23 | 27 | 30 | 35 | 40 | 50 |
| 90 | 16 | 17 | 20 | 23 | 26 | 29 | 33 | 38 | 44 | 52 |
| 100 | 20 | 21 | 23 | 25 | 28 | 31 | 35 | 40 | 47 | 55 |

This table can be supplemented with further considerations, for example characteristics of the patient such as age, sex, etc. to achieve greater selectivity.

By determining the effective depth, the incorporation of a skinfold calliper for measuring body fat is prevented, reducing the possibility of error in the process, as it is automatically generated by the system without depending on the therapist.

Figure 4:
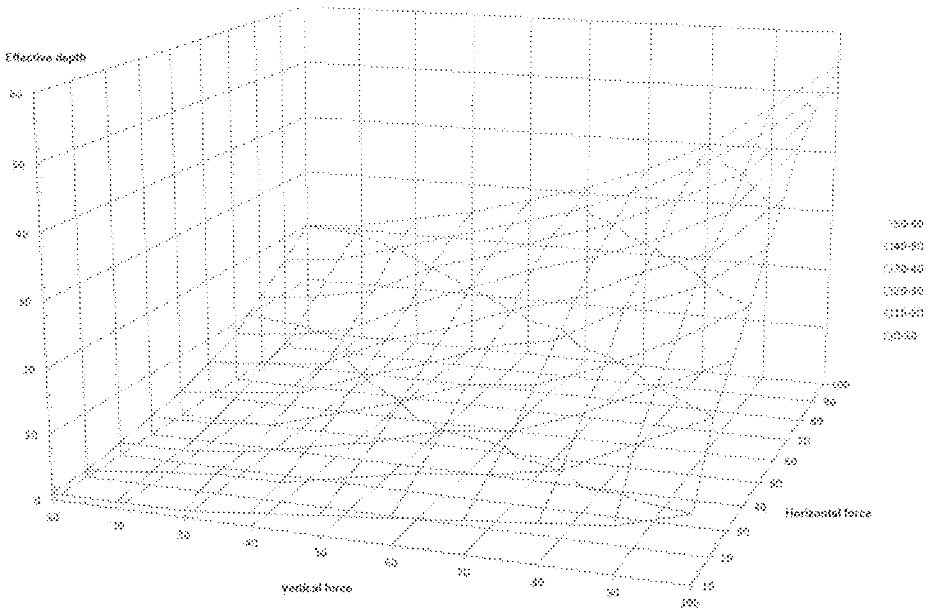
FIG. 4 illustrates a graph that is used for relating variables.

FIG. 4 illustrates a graph which serves to relate the vertical force, torque and effective depth variables, corresponding to the values in the table. Note that the torque and vertical force values are dimensionless, since they correspond to percentages of the direct value of the sensor implemented in the equipment from which the table was empirically taken.

Usually, the embodiments of the invention enable the radiation to be applied to be selected based on the type of patient and/or treatment. During the application of the massage, the torque is monitored to ensure it is appropriate. Otherwise, in some embodiments, a warning signal is issued to the therapist.

Additionally, types of patients can be defined according to their body mass: large, normal, thin. Additionally, body areas can be defined where the treatment is to be performed. Certain areas have a greater or lesser tendency to accumulate fat.

The above are examples for easily customising the treatment.

In other embodiments, the above empirical relationship can be implemented by means of equivalent formulas which associate vertical force and torque values with depth.

In the embodiments discussed, the therapist is the one who decides to apply more or less force assisted by the massage device. In other embodiments, the rotation force can be regulated to control the torque and thus maintain the effective depth of the treatment independent of the force applied by the therapist, albeit within a reasonable working range, giving a warning if it is not outside the appropriate range. In other, more automated embodiments, vertical force control may be implemented, although it would complicate the mechanical system.

The invention claimed is:

1. A body massage system comprising:

a source device comprising:

an electromagnetic radiation generator configured for generating electromagnetic radiation with a fixed frequency and intensity; and a handpiece adapted to connect to the source device, the handpiece comprising:

a plurality of movable heads for applying force on a patient's body, wherein the plurality of movable heads comprise a conductive material, wherein the plurality of movable heads are adapted to rotate;

a massage arm connected to the plurality of movable heads;

a motor mechanically coupled to the plurality of movable heads for conveying at least a rotation motion thereto;

a conductive cable adapted to receive the electromagnetic radiation generated by the electromagnetic radiation generator;

a conductive ring disposed between the motor and the plurality of movable heads, the conductive ring adapted to receive the electromagnetic radiation via the conductive cable;

wherein the plurality of movable heads receive the electromagnetic radiation via the conductive ring and apply the electromagnetic radiation to the patient's body;

measurement means comprising a vertical force sensor configured for measuring the force applied perpendicularly on the patient's body to obtain one or more vertical force measurement values, and a torque sensor configured for measuring a resistance to rotation of the plurality of movable heads on the patient's body to obtain one or more torque measurement values;

a processing unit comprising a register storing at least the one or more vertical force measurement values and the one or more torque measurement values;

wherein the processing unit is configured for determining an effective depth representing a distance that can be reached on the patient's body with the massage;

wherein said effective depth is determined based at least on the one or more vertical force measurement values and the one or more torque measurement values, and on an amount of fat of the patient; and wherein the processing unit is further configured for determining in real time, whether, for the effective depth, the applied vertical force is appropriate.

2. The massage device according to claim 1, wherein the measurement means further comprise a temperature sensor, so that the processing unit determines whether a temperature is appropriate when it is within a predetermined temperature range.

3. The massage device according to claim 2, wherein the processing unit is configured for acting on the electromagnetic radiation generator if the temperature is not appropriate.

4. The massage device according to claim 1, further comprising an indicator for warning if the vertical force, torque and/or temperature is appropriate when within a predetermined vertical force range, a predetermined torque range and/or a predetermined temperature range.

5. The massage device according to claim 4, wherein the processing unit is configured to act on the motor if the vertical force or torque is not appropriate.

6. The massage device according to claim 1, further comprising an interface for setting values at least for the torque of the movable heads, frequency and intensity of the electromagnetic radiation.

7. The massage device according to claim 1, wherein the electromagnetic radiation generated is a wave modulated at a frequency value comprised between 10 Hz and 40 KHz.

8. The massage device according to claim 7, wherein the modulation is by pulse width.

9. The massage device according to claim 1, wherein the heads are spherical in shape.

10. The massage device according to claim 1, wherein the source device further comprises a power supply configured for supplying energy to the electromagnetic radiation generation means and to the motor.

* * * * *